Patented May 16, 1950

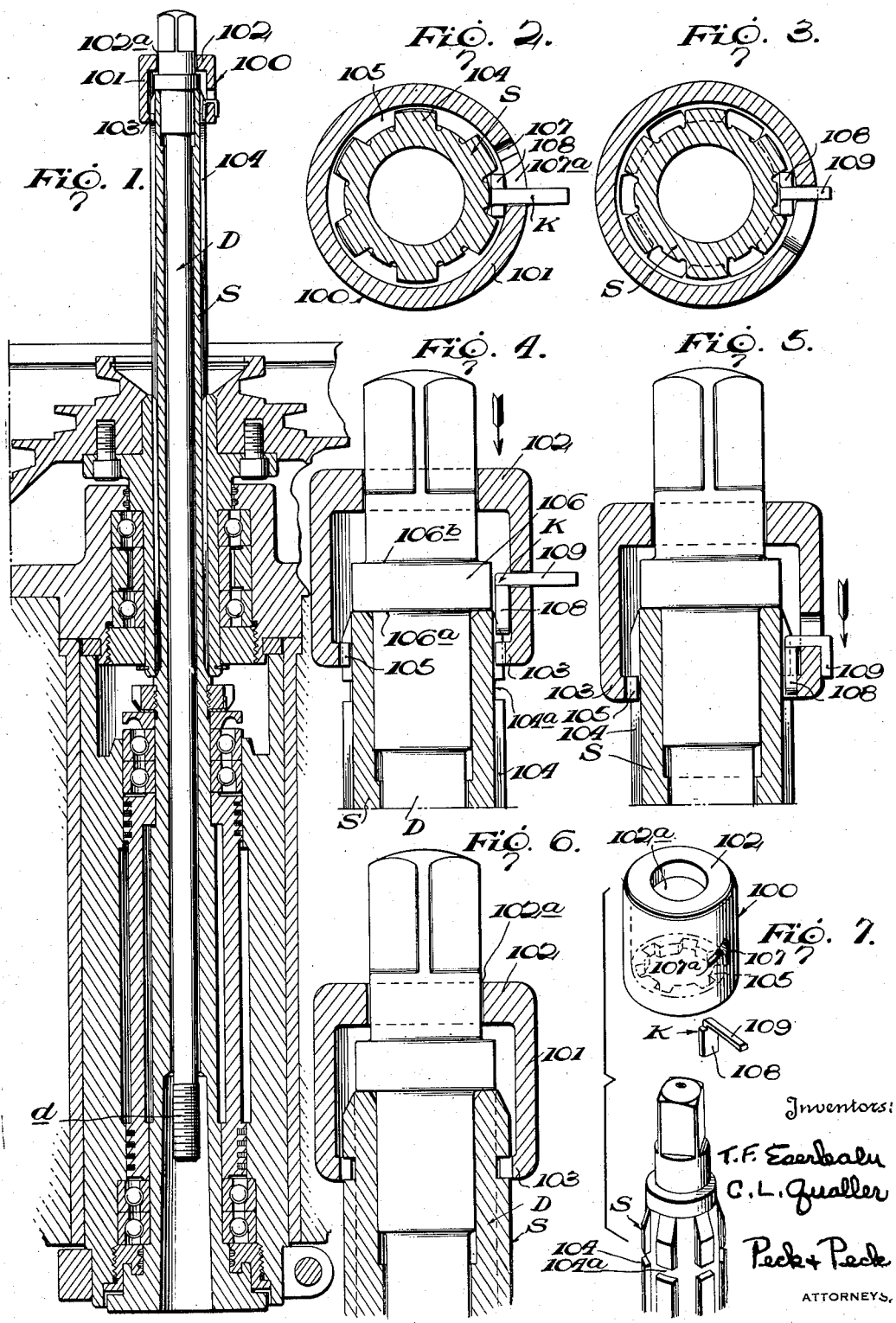

2,508,237

UNITED STATES PATENT OFFICE 2,508,237

BACK-OFF NUT

Theodore F. Eserkaln, Wauwatosa, and Clifford L. Qualler, Racine, Wis., assignors to George Gorton Machine Co., Racine, Wis., a corporation of Wisconsin Application September 29, 1948, Serial No. 51,684

3 Claims. (Cl. 90—11)

This invention relates to certain improvements in back-off nuts; and the nature and objects of the invention will be readily recognized and understood by those skilled in the arts involved in the light of the following explanation and detailed description of the accompanying drawings illustrating what we now consider to be the preferred embodiments or mechanical expressions of our invention from among various other embodiments, forms, designs, constructions, arrangements, combinations and equivalents of which our invention is capable within the broad spirit and scope thereof as defined by the appended claims.

A general object of the invention is to provide an improved, mechanically and structurally simple and efficient back-off nut for releasably locking the outer end of a cutter spindle draw bar to the adjacent end of the cutter spindle, in such a manner as to effectively insure against the draw bar becoming unlocked or released during spindle rotation either by the forces developed by such rotation or by inadvertent or accidental contacts with or blows from external objects.

With the foregoing as well as certain other objects, features and results in view, which others will be readily apparent from the following detailed description and explanation, our invention consists in certain novel features in design, and construction of parts and elements and in various associations, combinations and sub-combinations thereof, all as will be more fully referred to and specified hereinafter.

Referring to the accompanying drawings in which similar reference characters refer to corresponding parts and elements throughout the several figures thereof:

Fig. 1 is a vertical, longitudinal section through a machine tool the cutter head, the vertically movable cutter spindle journaled therein and the spindle mounted draw bar, showing the backoff nut of our invention in mounted, locked position on the upper end of the spindle to constrain the draw bar against displacement.

Fig. 2 is a transverse section through the back-off nut in initially mounted position on the spindle, preparatory to movement to final locked position thereon.

Fig. 3 is a transverse section through the back-off nut and spindle showing the nut in locked position on the spindle, over and holding the draw bar against displacement.

Fig. 4 is a longitudinal section through the backoff nut with the nut in initial position corresponding to the position shown in Fig. 2.

Fig. 5 is a longitudinal section similar to Fig. 4, but with the backoff nut in locked position on the spindle and draw bar, such position corresponding to that shown in Fig. 3.

Fig. 6 is a longitudinal section through the spindle and backoff nut in the locked position of Fig. 5, but taken in a plane 90° around the spindle from the plane in which Fig. 5 is taken.

Fig. 7 is a detailed perspective view of the upper end of the cutter spindle and draw bar, and of the backoff nut and key, the nut and key being shown separated but in positions relative to each other and to the spindle and draw bar, for mounting and assembly.

We have provided an improved and efficient back-off nut construction and arrangement for releasably locking a cutter spindle draw bar against axial displacement from the spindle, as well as providing an effective and positive back-up structure against which the draw bar is forced when loosened, in order to effectively and positively release the cutting tool holder in the spindle with which the drawbar is connected.

Referring to Figs. 1 to 7, with particular reference to Fig. 1, the cutter spindle S is formed with a longitudinal bore therethrough in the usual manner, which bore opens at the cutting tool or cutting end of the spindle into the taper socket at that end of the spindle for receiving and mounting therein, a tool holder, such as a chuck or the like. A drawbar D is slidably mounted in and extends through the spindle bore and provides at its inner end within the cutting tool holder socket an externally threaded section $d$ for operative connection with a tool holder. The outer end of drawbar D at the upper end of spindle S, extends a distance outwardly beyond the adjacent end of the spindle and a back-off nut 100 of our invention, is releasably mounted and secured to the adjacent spindle and in association with the end of the drawbar D so as to mount the drawbar against displacement while providing a back-up structure against which the drawbar may be engaged to force release of the cutter holder by the bar when the bar is loosened.

The back-off nut 100 is in the form of a cap-like member having an annular side wall 101, an end wall 102 at one end thereof provided with an axial bore 102a therethrough, and an inwardly turned radially disposed flange 103 around the opposite open end thereof, as will be clear by reference to Figs. 4 to 7 inclusive.

The outer end length of the cutter spindle S is formed and provided with the splines 104 disposed longitudinally thereof and spaced therearound. The inwardly extended flange 103 of nut 100 is suitably splined, as for example by broaching, to provide a series of spaced spline teeth 105 therearound of the same dimensions and spacing as the splines 104 on cutter spindle S. Spline teeth 105 are formed of a profile complementary to the profile of the spline grooves between the splines of cutter spindle S, as will be clear by reference to Fig. 2.

An annular groove 104a (see Fig. 4) is provided around the cutter spindle S through the splines 104 thereof, with this groove spaced a distance inwardly from the outer end of the spindle, such that, the spline teeth 105 of nut 100 will be aligned therewith and extend thereinto when the nut is in mounted position on the spindle and drawbar. The drawbar D is formed and provided with an annular, radially outwardly disposed flange 106 therearound spaced inwardly a distance from the outer end of the drawbar. Flange 106 presents at the inner side thereof an annular seating surface 106a therearound for engagement with and seating upon the outer end edge of spindle S to provide an abutment surface against which the drawbar is engaged for rotating the threaded inner end section d into tool holder tightening position. The outer or upper side of flange 106 provides an annular seating and abutment surface 106b therearound for engaging and seating upon the inner side of the outer end wall 102 of nut 100, to thereby function as an abutment in the operation of rotating the drawbar to loosen a tool holder and force the release of the holder in the spindle.

The side wall 101 of the nut 100 is formed with a bayonet slot therethrough in a location intermediate end wall 102 and inner end flange 103, with this slot providing a vertical or axially disposed portion 107 opening at its inner end onto a horizontally disposed portion 107a substantially perpendicular to the vertical portion 107.

A locking key K is provided for releasably locking nut 100 in position on spindle S and drawbar D. This key, in this example, includes a plate 108 having a width to slidably fit within a spline groove between spindle splines 104, and a thickness to be slidably received between the inner surface of the spline groove and the adjacent portion of wall 101 of nut 100, as clearly shown by Figure 12 of the drawings. The plate 108 of key K is provided with a locking strip or arm 109 extending laterally from one end of plate 108 and having cross sectional dimensions to be slidably received in and extend outwardly through either of the portions 107 or 107a of the bayonet slot K in the nut. The key 108 is formed of a suitable readily bendable material.

In applying and locking the back-off nut 100 on spindle S in operative association with the spindle drawbar D, the key K is positioned with the locking plate 108 thereof at the inner side of nut side wall 101 and with the arm or locking strip 109 extended outwardly through the horizontal portion 107a of the bayonet slot in the nut side wall. The nut with the key positioned therein, is then passed down over the outer end of the drawbar D with such end passing through the bore 102a of the nut outer end wall, and with the spline teeth 105 engaged in the spline groove between a pair of adjacent spindle splines 104. This position of the back-off nut on spindle S and the drawbar D, is shown in Fig. 4. The back-off nut is then moved inwardly on the spindle and on the spindle and drawbar until the spline teeth are aligned with the groove 104a formed around the spindle through the spindle splines 104. In applying the nut the locking plate 108 of the key is suitably received in a spline groove between adjacent spindle splines 104, the plate having a length greater than the width of the groove 104a through the spindle splines. The back-off nut 100 in position mounted on spindle S with the splined teeth of the nut aligned with the groove 104a through the spindle splines, is shown in Figure 3.

To complete the mounting and locking of the back-off nut on the spindle S and drawbar D, the nut is rotated in a clockwise direction on the spindle to a position with the spline teeth located in the groove 104a through the spindle splines, in position engaged under the inner ends of the outer lengths of the splines 104, respectively, so that, the nut is thereby held against axial displacement outwardly on the spindle. The nut is held against inward displacement axially of the spindle S by the spline teeth engaged against the outer ends of the inner lengths of the spindle splines. The rotation of the back-off nut to position engaging the spline teeth 105 with the spindle splines 104 is accompanied by movement of the key locking strip 109 through the horizontal portion 107a of the bayonet slot until the strip 109 is aligned with the vertical portion 107 of the slot. The length of slot portion 107a is such that the key locking strip is aligned with bayonet slot portion 107 when spline teeth 105 are aligned and engaged with the spindle spline ends in the spline groove 104a. The locking plate 108 and locking arm or strip 109 of the key K have a sufficiently loose or running fit in the spindle spline groove and in the vertical portion 107 of the bayonet slot, so that, locking strip 109 drops or may be readily forced downwardly into slot portion 107, with the locking plate 108 dropping downwardly in the spindle spline groove. Thus the locking arm or strip 109 together with the locking plate 108 will maintain the back-off nut 100 against rotation on the spindle S and the drawbar D. The back-off nut is finally secured and locked in such position by bending the outwardly projected end of locking strip 109 downwardly and inwardly against the outer side of the nut to the locking position shown in Figs. 3 and 5.

With the back-off nut 100 in mounted, locked position on the cutter spindle S over and confining the outer end of the spindle drawbar, the drawbar may be rotated in a direction to tighten a tool holder in the spindle with the seating surface 106a of flange 106 seated in abutting engagement on the outer end edge of cutter spindle S (see Fig. 5). When it is desired to loosen the drawbar to force release of the cutter holder in the cutter spindle, the drawbar is rotated in the proper direction and as the drawbar is thereby loosened and moves outwardly in the spindle, the seating surface 106b of flange 106 may have abutting engagement against the inner side of back-off nut wall 102 to thus limit outward movement of the drawbar relative to the spindle and by continued rotation of the drawbar to force release of the cutter holder.

In the event that the drawbar D becomes detached from a cutter holder and is thus freed for axial movement in the cutter spindle, the drawbar will be held against displacement outwardly through or discharge from the spindle by the engagement of flange 106 with the outer end wall 102 of the back-off nut 100. The back-off nut when in locked position by the key K cannot readily become loosened or unlocked from the spindle and drawbar under normal operating conditions, as the key securely maintains the nut against rotation from locked position on the spindle with the spline teeth 105 of the nut engaged under the spline ends of the spindle splines. The back-off nut may, however, be readily unlocked and released by bending up locking strip 109 of the key K, raising the key in the portion 107 to the level of the portion 107a of the bayonet slot, and then rotating the nut to position with the splined teeth 105 thereof aligned with and located in the spline grooves between the spindle splines 104, respectively.

A back-off nut embodying the principles and features of our present invention is of general adaptability to various cutter spindle and drawbar combinations, and it is not intended or desired to limit or restrict the invention to the specific mechanical and structural expression of the illustrated embodiment or to limit any form of back-off nut of the invention to application and use with the particular cutter spindle and drawbar arrangement and construction, or to use with the particular type of construction of cutter head and its supporting structure, of this example.

An important feature of a back-off nut of the invention resides in the fact that no threading is utilized in assembling and mounting the nut on the cutter spindle. The cutter spindle S of the cutter head unit of the present example is reversible, that is, rotatable in either direction, so that, a back-off nut threaded on or to the spindle by either a right or left thread is not satisfactory for use with such a reversible cutter spindle, as the nut will have the tendency to loosen when the spindle is rotated in one or the other direction depending upon the hand of the nut threading. With the back-off nut of the invention the fastening of the nut is independent of and unaffected by the direction of spindle rotation.

It will also be evident to those skilled in the arts involved that various changes, modifications, substitutions, eliminations and additions may be resorted to without departing from the broad spirit and scope of our present invention and its various features, and hence, we do not desire or intend to limit our invention in all respects to the exact and specific disclosures of the example embodiments herein illustrated and described, except as may be required by specific intended limitations thereto included in any of the appended claims.

What we claim is:

1. In combination, a cutter spindle having an axial bore therethrough, said spindle being formed with external splines thereon and therearound, said splines being formed with transverse slots therethrough spaced inwardly from the outer end of said spindle to form an annular groove around said spindle, a drawbar extending through and being axially and rotatively movable in said spindle bore, and a back-off nut releasably locked on the outer end of said spindle over and constraining said drawbar against axial displacement from said spindle, said back-off nut including a cap-like body having one end thereof closed by an end wall formed with an axial bore therethrough for receiving the outer end of said drawbar, the inner end of said body being formed with an inwardly turned flange therearound providing spline teeth for engaging in the transverse slots through said spindle splines to secure said nut body against axial displacement on the spindle, said nut body being formed with a bayonet slot through the side wall thereof, a locking key for engaging between a pair of adjacent spindle splines to maintain said splines and teeth in engaged position, and said key having an arm portion extending outwardly through said bayonet slot adapted to be bent inwardly into position at the outer side of said back-off nut body engaged in said bayonet slot to prevent displacement of said key and nut body relative to said cutter spindle.

2. A back-off nut for releasable locking on an externally splined cutter spindle for constraining a cutter spindle mounted drawbar against outward displacement, comprising, a cap-like body having an annular side wall and an outer end closing wall formed with an axial bore for receiving therethrough the outer end of a drawbar, the inner end of said body being open for fitting down over and receiving therethrough a cutter spindle, said body being formed at the open inner end thereof with a series of spaced, inwardly extended spline teeth therearound for engagement with the splines of a spindle, and the annular wall of said body being formed with a slot therethrough comprised of an axially disposed portion opening at one end into a portion disposed transversely of the axis of said body for receiving therein a locking key.

3. A back-off nut for releasable locking on an externally splined cutter spindle to constrain a cutter spindle mounted drawbar against outward displacement from a spindle, comprising, a cap-like body having an annular side wall and an outer end closing wall formed with an axial bore for receiving therethrough the outer end of a drawbar, the inner end of said body being open for fitting down over and receiving therethrough a cutter spindle, said body being formed at the open inner end thereof with a series of spaced, inwardly extended spline teeth therearound for engagement with the external splines of a spindle, the annular side wall of said body being formed with a bayonet slot therethrough, and a locking key including a locking plate for positioning at the side of said annular wall, and a bendable locking arm extended outwardly through said bayonet slot to the exterior of said body.

THEODORE F. ESERKALN.
CLIFFORD L. QUALLER.

REFERENCES CITED

The following references are of record in the file of this patent:

UNITED STATES PATENTS

| Number | Name | Date |
|---|---|---|
| 892,479 | Wesson | July 7, 1908 |
| 1,212,330 | Daly | Jan. 16, 1917 |
| 1,337,313 | Groene | Apr. 20, 1920 |
| 1,794,361 | Armitage et al. | Mar. 3, 1931 |
| 1,933,575 | Woytych | Nov. 7, 1933 |
| 1,971,299 | Fickett et al. | Aug. 21, 1934 |
| 2,026,448 | Turrettini | Dec. 31, 1935 |
| 2,078,859 | Lapham | Apr. 27, 1937 |
| 2,153,424 | MacRae | Apr. 4, 1939 |
| 2,387,412 | Schnable | Oct. 23, 1945 |
| 2,404,561 | Bannow | July 23, 1946 |